United States Patent
Kistler et al.

(10) Patent No.: US 7,118,077 B1
(45) Date of Patent: Oct. 10, 2006

(54) PLATFORM AND SYSTEM FOR MASS STORAGE AND TRANSFER IN SPACE

(76) Inventors: Walter P. Kistler, 11423 Red Wood Rd. NE., Redmond, WA (US) 98052; Robert A. Citron, 14907 19th Ave. SE., Mill Creek, WA (US) 98012; Thomas C. Taylor, 3705 Canyon Ridge Arc, Las Cruces, NM (US) 88011

( * ) Notice: Subject to any disclaimer, the term of this patent is extended or adjusted under 35 U.S.C. 154(b) by 0 days.

(21) Appl. No.: 11/076,950

(22) Filed: Mar. 11, 2005

(51) Int. Cl.
*B64G 1/00* (2006.01)
(52) U.S. Cl. .................................................. 244/173.1
(58) Field of Classification Search ............. 244/173.1, 244/173.2, 173.3, 173.4, 173.5, 159.4
See application file for complete search history.

(56) References Cited

U.S. PATENT DOCUMENTS

| | | | | |
|---|---|---|---|---|
| 2,404,195 A | * | 7/1946 | Schlieben ................ | 244/137.1 |
| 2,629,336 A | * | 2/1953 | Seidel .......................... | 104/38 |
| 2,775,355 A | * | 12/1956 | Leitner et al. .............. | 414/498 |
| 3,020,993 A | * | 2/1962 | Heinrich et al. ............. | 193/38 |
| 3,029,570 A | * | 4/1962 | Strakosch, Jr. et al. ......... | 53/64 |
| 3,095,987 A | * | 7/1963 | Sable ........................... | 410/1 |
| 3,202,243 A | * | 8/1965 | Seward ....................... | 187/237 |
| 3,241,500 A | * | 3/1966 | Barclay et al. ............. | 410/111 |
| 3,251,311 A | * | 5/1966 | Saxonmeyer .............. | 104/32.1 |
| 3,439,822 A | * | 4/1969 | Miklos ........................ | 410/52 |
| 3,751,849 A | * | 8/1973 | Goldfarb et al. ............ | 446/246 |
| 3,774,784 A | * | 11/1973 | Glass ......................... | 414/239 |
| 3,861,541 A | * | 1/1975 | Taft et al. ................... | 414/345 |
| 3,884,158 A | * | 5/1975 | Rumell .......................... | 410/1 |
| 4,044,974 A | | 8/1977 | Lingley et al. | |
| 4,103,503 A | * | 8/1978 | Smith ......................... | 405/196 |
| 4,132,373 A | * | 1/1979 | Lang ....................... | 244/159.4 |
| 4,298,178 A | * | 11/1981 | Hujsak .................... | 244/172.5 |
| 4,300,737 A | | 11/1981 | Byrne et al. | |
| 4,324,374 A | | 4/1982 | Wittmann et al. | |
| 4,471,926 A | | 9/1984 | Steel | |
| 4,607,815 A | * | 8/1986 | Turci et al. ............... | 244/172.4 |
| 4,609,169 A | | 9/1986 | Schweickert et al. | |
| 4,637,447 A | | 1/1987 | Frank et al. | |
| 4,652,204 A | * | 3/1987 | Arnett ...................... | 414/751.1 |
| 4,664,343 A | | 5/1987 | Lofts et al. | |
| 4,679,752 A | | 7/1987 | Wittmann et al. | |
| 4,699,339 A | * | 10/1987 | Rosen et al. ............. | 244/172.2 |
| 4,771,971 A | * | 9/1988 | Ludwig et al. .......... | 244/171.8 |
| 4,775,120 A | | 10/1988 | Marwick | |

(Continued)

OTHER PUBLICATIONS www.wikipedia.org, Rack and Pnion, p. 1 of 1.*

(Continued)

*Primary Examiner*—Teri Pham Luu
*Assistant Examiner*—S. A. Holzen
(74) *Attorney, Agent, or Firm*—Greenblum & Bernstein, P.L.C.

(57) ABSTRACT

A platform for storage and transfer of payloads in space includes a plate for supporting a payload, and a transfer mechanism for transferring the payload to and from the plate. A groove extends diametrically between two edges of the plate for receiving a rail provided on the payload. The rail includes a plurality of teeth, and the transfer mechanism includes a gear which interacts with the teeth for moving the rail. Two platforms may be positioned adjacent to each other for transferring a payload. Docking of the two platforms includes engagement of tapered pins and tapered holes on the platforms. In this manner, the grooves of the platforms are aligned. The rail is passed between the grooves of the platforms for transferring the payload between the platforms.

19 Claims, 6 Drawing Sheets

U.S. PATENT DOCUMENTS

| | | | |
|---|---|---|---|
| 4,896,848 A | 1/1990 | Ballard et al. | |
| 4,941,794 A * | 7/1990 | Hara et al. | 414/341 |
| 4,974,796 A * | 12/1990 | Carr et al. | 244/137.1 |
| 5,050,821 A * | 9/1991 | Kerstein et al. | 244/173.1 |
| 5,083,726 A | 1/1992 | Schurr | |
| 5,092,545 A | 3/1992 | Butterfield et al. | |
| 5,119,305 A * | 6/1992 | Ferro | 710/300 |
| 5,133,517 A * | 7/1992 | Ware | 244/171.1 |
| 5,141,181 A | 8/1992 | Leonard | |
| 5,158,249 A | 10/1992 | Uphoff | |
| 5,170,968 A * | 12/1992 | Helmner | 244/137.1 |
| 5,183,376 A * | 2/1993 | Aralt | 414/592 |
| 5,236,153 A | 8/1993 | LaConte | |
| 5,253,827 A * | 10/1993 | Funk et al. | 244/173.3 |
| 5,305,970 A * | 4/1994 | Porter et al. | 244/172.2 |
| 5,411,226 A * | 5/1995 | Jones et al. | 244/173.3 |
| 5,429,328 A * | 7/1995 | Dobbs et al. | 244/172.5 |
| 5,595,123 A * | 1/1997 | Tao et al. | 105/396 |
| 5,720,450 A * | 2/1998 | Kanne | 244/173.1 |
| 5,816,539 A | 10/1998 | Chan et al. | |
| 5,826,825 A | 10/1998 | Gabriel | |
| 5,967,464 A * | 10/1999 | Miyoshi | 244/172.5 |
| 5,997,217 A * | 12/1999 | Verret | 405/196 |
| 6,016,997 A * | 1/2000 | Wendt et al. | 244/115 |
| 6,059,233 A | 5/2000 | Koppel et al. | |
| 6,106,209 A * | 8/2000 | Krenek | 414/24.5 |
| 6,138,951 A * | 10/2000 | Budris et al. | 244/173.3 |
| 6,168,116 B1 * | 1/2001 | Renshall et al. | 244/172.6 |
| 6,273,237 B1 * | 8/2001 | Bazydola et al. | 198/375 |
| 6,276,639 B1 * | 8/2001 | Hornung et al. | 244/173.3 |
| 6,296,206 B1 * | 10/2001 | Chamness et al. | 244/173.3 |
| 6,312,206 B1 * | 11/2001 | Pylate et al. | 414/345 |
| 6,322,023 B1 * | 11/2001 | Soranno et al. | 244/159.4 |
| 6,360,994 B1 | 3/2002 | Hart et al. | |
| 6,382,680 B1 * | 5/2002 | Horimoto | 285/81 |
| 6,385,512 B1 | 5/2002 | Belbruno | |
| 6,416,018 B1 * | 7/2002 | DiVerde et al. | 244/137.1 |
| 6,454,215 B1 * | 9/2002 | Pedreiro | 244/173.1 |
| 6,481,670 B1 | 11/2002 | Bigelow et al. | |
| 6,494,304 B1 * | 12/2002 | Jaynes et al. | 198/345.2 |
| 6,557,800 B1 * | 5/2003 | Medina et al. | 244/118.1 |
| 6,557,803 B1 | 5/2003 | Carpenter et al. | |
| 6,568,639 B1 | 5/2003 | Carpenter et al. | |
| 6,612,522 B1 | 9/2003 | Aldrin et al. | |
| 6,666,409 B1 | 12/2003 | Carpenter et al. | |
| 6,669,148 B1 | 12/2003 | Anderman et al. | |
| 6,726,431 B1 * | 4/2004 | Morrell | 414/340 |
| 6,739,555 B1 * | 5/2004 | Mazanek et al. | 244/172.4 |
| 6,817,578 B1 * | 11/2004 | Garcia et al. | 244/137.1 |
| 6,962,473 B1 * | 11/2005 | Scranton et al. | 414/475 |
| 2002/0074456 A1 * | 6/2002 | Marrero | 244/137.1 |
| 2002/0079407 A1 | 6/2002 | Lounge et al. | |
| 2003/0021660 A1 * | 1/2003 | Wells | 414/340 |
| 2003/0057326 A1 * | 3/2003 | Medina et al. | 244/137.1 |

OTHER PUBLICATIONS www.wikipedia.org, Lunar Orbiter Program, pp. 1-4.*
U.S. Appl. No. 10/862,604 to Kistler et al., which was filed on Jun. 7, 2004.
U.S. Appl. No. 11/076,926to Kistler et al., which was filed on Mar. 11, 2005.
Cady et al., "Cryogenic Propellant Management Architectures To Support The Space Exploration Initiative", AIAA-90-3713, Sep. 1990, 11 pages.
Hodge, "Space Transfer Vehicles For The Space Exploration Initiative", AIAA-92-1418, Mar. 1992, 9 pages.
NASA Brochure "The Vision For Space Exploration"dated Feb. 2004, 32 pages.
NASA Synopsis "Exploration Systems Enterprise Request For Information", dated Apr. 21, 2004, 10 pages.

* cited by examiner

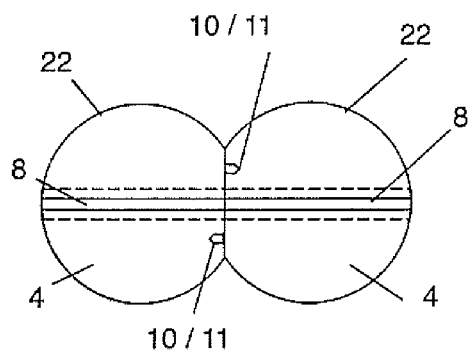
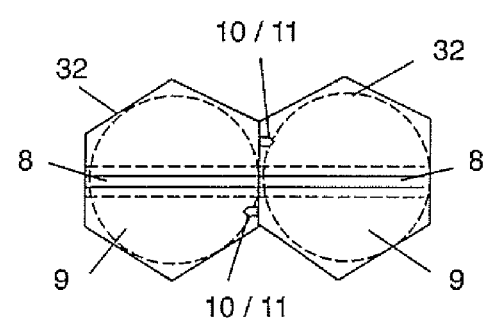
FIG. 2A
FIG. 2B
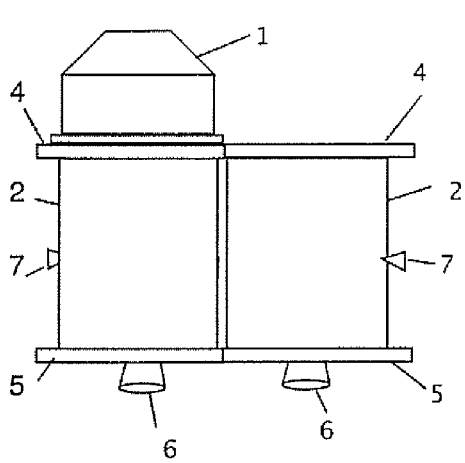
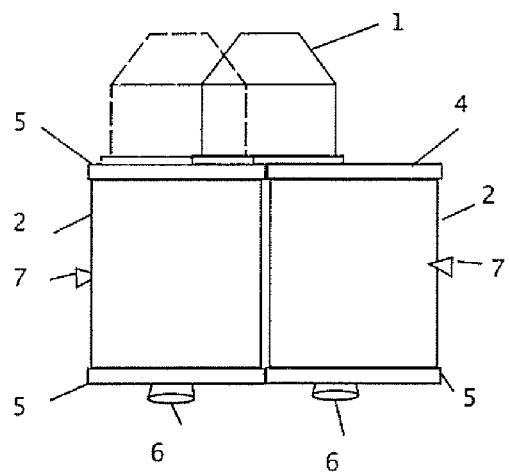
FIG. 1A
FIG. 1B

PLATFORM AND SYSTEM FOR MASS STORAGE AND TRANSFER IN SPACE

No government funding, no government support or government contract or clause is related to this invention.

BACKGROUND OF THE INVENTION

1. Field of the Invention

The present invention relates to apparatus and method for storing and transferring payloads and propellants in space.

2. Description of the Related Art

The transportation of cargo and propellant mass between locations in space and maintaining a support platform in orbit is expensive. High costs create a barrier to the commercial transportation hardware development for space and to the investment of private capital in technically viable space transportation ventures. Part of this high cost is the expense caused by combining unmanned and manned cargo on the same type of space vehicle and requiring the safety and reliability to be the same for both classes of mass transported. Another reason for costs higher than necessary is the previous practice of using the same vehicle to transport mass in each of transportation cycles beyond the earth's surface instead of transferring mass, payloads and propellant from one vehicle to another as the requirements change. For example, the launch from earth's surface required a vehicle capable of traveling through the earth's atmosphere and also capable of using attitude control systems in the vacuum of space. Historically, these different conditions were satisfied by one vehicle. In a mature Space Exploration Initiative (SEI) transportation systems with separate transportation cycles on earth changing from ocean travel to land transportation would require a change in vehicle types from water requirements to land requirements. The resulting transfer location became a harbor or transportation node with a point of commerce created and various vehicle types obtained transportation related services including specialized cargo and fuel transfer hardware.

Rocket propelled space vehicles transport cargo outside the proximity of the Earth in airless space. Such vehicles may, for example, start a trip from Earth orbit and travel to the surface of the Moon. Such trips use large amounts of propellants, requiring the use of enormous multi-stage rockets. Such rockets may be similar to the Saturn first stage of the Apollo project, which landed the first man on the Moon more than 30 years ago. The longer the trip the more onboard propellant must be transported and the space vehicles grow to a size that is difficult to finance. On mature transportation cycles on earth fuel and cargo transfer services are aided by fuel stations along the road and container cranes to transfer cargo. Innovation in propellant and cargo transfer services is required for space transportation.

Rendezvousing, docking and transferring payloads between space vehicles was performed more than forty years ago in the Apollo program with the lunar orbit transfer of humans from a transport vehicle to a lunar lander vehicle in lunar orbit and saved both propellant and vehicle mass. More recently between shuttles and the International Space Station. For example, in the Apollo program the astronauts had to transferred humans and cargo to/from the lunar lander to the command module in lunar orbit. Today the procedures have been refined and are used, for example, between the Russian Soyuz and the International Space Station. In such conventional systems, the actual transfer of cargo is performed by people after docking of the vehicles and opening of a hatch. However, the automatic transfer of cargo between two vehicles in space, such as unmanned space vehicles, is a more complex operation which been slow to mature in conventional manned and unmanned systems. Accordingly, the transfer of payloads between vehicles in space is currently a labor intensive and inefficient operation. Eventually, mature transportation cycles will emerge space cargo and human transfer and support services will be separated and each will become automated allowing an acceleration in the transportation maturing process and a potential reduction in costs. Cargo and payloads will be transferred from one vehicle to another vehicle with a different design, much the way a ship transfers cargo from a ship to a truck or rail car at a port. If the cargo were transferred automatically, then it would accelerate the maturing process, but maybe more expensive given the cost of labor on earth. The modern container ship, for example, is unloaded in a near automatic manner with a single crane operator compared to a cargo net and gang of men fifty years ago. Now the cost of labor in space is expensive and the unmanned cargo transfer is likely to be automatic as well as the ship that carries the unmanned cargo. The ratio of human cargo (1%) and unmanned cargo (99%) is significantly great to make it an issue in the design process, because the cost of a manned or crewed vehicle is much greater than an unmanned vehicle.

SUMMARY OF THE INVENTION

The present invention has been made in view of the above-described problems. Accordingly, it is an object of the present invention to provide a method and an apparatus for more efficient and less complex storing and transferring of payloads and propellants in space.

In the transportation of cargo to and from the moon, a payload carrier or pallet can used to support and transfer cargo mass loads (or payloads) into a space transport vehicle. Two types of space vehicles exists, with one discarding the hardware and one type reusing the hardware. The payload carrier is designed to be transported from the earth surface to low earth orbit with a protective shroud, which is jettisoned as it exits the atmosphere on the expendable vehicles. Commercially available space launch hardware is available for this segment or transportation cycle. The customer's mass inside a payload carrier is attached to an earth originating space launch vehicle, which is capable of rendezvous and docking in space with an earth orbit to lunar orbit transport vehicle. The payload carrier is designed to be transferred easily from a first space launch vehicle to a second lunar transport vehicle in a vacuum. This operation requires no shroud, a vehicle that is required to operate only in a vacuum and no on site labor. Further expansion to transportation support services like propellant transfer, surge cargo storage and commerce are future growth options at each transfer location in orbit. The standard payload carrier may be transferred to a third vehicle with landing legs in lunar orbit and is expandable to orbits around another celestial bodies, beyond the moon. The transfer of mass can be automatic after the delivery vehicle aligns with the receiving vehicle, and can be accomplished without humans being on location in space. The payload carrier or pallet can be used for transport both to and from the moon, so that it can be a reusable hardware item. The payload carrier or pallet can also be used for an independent application on the lunar surface, as is sometimes the case in remote logistics situations.

The present invention further provides payload and propellant transfer hardware for manned or unmanned orbital transportation vehicles, which can move payloads from one transportation device to another. Such hardware permits delivery of payloads using transportation hardware in earth orbit to locations beyond earth orbit. Early containers and tanks are disposable and later evolve to being reused. The present invention provides affordable commercial payload transportation services to and from space vehicles, orbital transportation support nodes and celestial bodies at either end of various transportation cycles within space transportation in general.

According to one aspect of the invention, a platform for storage and transfer of payloads in space includes a plate configured to support a payload thereon, and a transfer mechanism configured to transfer a payload to and from the plate, and to hold the payload in position on the plate.

According to a further aspect of the invention, the platform is configured to be positioned in orbit around a celestial body. The platform is configured to transport a payload from an Earth orbit to a lunar orbit. The platform includes thrusters for positioning the platform. The platform includes a motor for moving the platform through space.

According to a further aspect of the invention, the plate includes a groove provided in a surface thereof, the groove being configured to receive a rail provided on the payload. The plate can be a substantially hexagonal disk, with the groove extending diametrically between two edge portions of the disk. At least one of the edge portions is a substantially flat edge portion which is substantially perpendicular to a longitudinal axis of the groove. The groove includes opposed lip portions which are configured to maintain an enlarged portion of the rail within the groove. The rail includes a thin portion extending from the enlarged portion and passing between the opposed lip portions of the groove. The enlarged portion of the rail includes a plurality of teeth, and the transfer mechanism is configured to interact with the teeth for moving the rail parallel to a longitudinal axis of the groove.

According to a further aspect of the invention, the transfer mechanism is configured to engage a rail provided on the payload for moving the rail and for holding the rail in position. The transfer mechanism includes a gear which engages the rail. The rail includes a plurality of teeth, the gear interacting with the teeth for moving the rail and for holding the rail in position. The transfer mechanism includes a motor for rotating the gear. The plate includes a chamber in which the gear is located. The chamber is connected to a groove provided in a surface of the plate, the groove being configured to receive the rail therein, the gear moving the rail parallel to a longitudinal axis of the groove.

According to a further aspect of the invention, the platform further includes a docking mechanism configured to facilitate positioning and docking of the platform. The docking mechanism includes a tapered pin. The docking mechanism includes a tapered hole. The docking mechanism is provided on an edge portion of the plate. The plate can be a substantially hexagonal disk, and the docking mechanism is provided on a substantially flat edge portion of the disk.

According to a further aspect of the invention, the platform further includes a docking mechanism configured to facilitate positioning and docking of the platform. The docking mechanism includes a plurality of tapered pins and tapered holes provided on edge portions of the plate for precisely aligning the plates of plural platforms to allow for the transfer of payload cargo and propellant tanks therebetween. The taper pins and tapered holes are shaped to permit rotating engagement and disengagement. A first of the platforms and a second of the platforms are configured to be positioned adjacent to each other in such a manner that a payload can be transferred from the plate of the first platform to the plate of the second platform.

According to a further aspect of the invention, the platform further includes a central structure with hexagonal top, middle and lower plates connected thereto. The plates of plural platforms can be positioned together with the flat edges of the hexagonal plates aligning with one another. Such positioning can be achieved with magnetic subsystems which align one plate with respect to an adjacent plate. Such magnetic subsystems rotate the plate with respect to an adjacent plate. The polarity of magnets at either end of the flat edge of the plate can be changed. In this manner, two plates can rotate with respect to each other by holding the plates together with the magnets at one end of flat edges of two adjacent plates, and reversing the polarity of the magnets at an opposite end of flat edges of two adjacent plates to force the opposite end flat edges away from each other and cause them to rotate to the next transfer position. Laser ranging, attitude control and propulsion subsystems can also be provided to facilitate positioning and aligning of the two platforms by rotational docking. The control and sensing of the positioning and alignment systems can be provided from a distance by remote control.

According to a further aspect of the invention, the platform further includes a central structure, the plate being connected to one end of the central structure, and a frame member connected to the central structure at a position spaced from the plate. The frame member is configured to releasably support a plurality of propellant tanks in positions around the central structure. The platform further includes plural extendable arms configured to transfer the propellant tanks to and from the frame member, and to hold the propellant tanks on the frame member.

According to another aspect of the invention, a system for storage and transfer of payloads in space includes a plurality of the platforms. A first of the platforms and a second of the platforms are configured to be positioned adjacent to each other in such a manner that a payload can be transferred from the plate of the first platform to the plate of the second platform.

According to a further aspect of the invention, at least one of the platforms is configured to be positioned in orbit around a celestial body. At least one of the platforms is configured to transport a payload from an Earth orbit to a lunar orbit. At least one of the platforms includes thrusters. At least one of the platforms includes a motor.

According to a further aspect of the invention, the plate of each platform includes a groove provided in a surface thereof, the grooves being configured to receive a rail provided on the payload. The first platform and the second platform are configured to be positioned such that the groove of the first platform is aligned with the groove of the second platform in such a manner that the rail on the payload can pass from the groove of the first platform to the groove of the second platform. The groove of each platform includes opposed lip portions which are configured to maintain an enlarged portion of the rail within the groove.

According to a further aspect of the invention, the transfer mechanism of each platform is configured to engage and move a rail provided on the payload. The transfer mechanism of the first platform and the transfer mechanism of the second platform interact with the rail in order to transfer the payload from the plate of the first platform to the plate of the second platform. The transfer mechanism of each platform includes a gear that interacts with a plurality of teeth on the rail.

According to a further aspect of the invention, each platform further includes a docking mechanism provided on an edge portion of the plate. The first platform and the second platform are configured to be positioned such that the docking mechanism of the first platform faces and is aligned with the docking mechanism of the second platform. The docking mechanism of each platform includes a tapered pin and a tapered hole. The first platform and the second platform are configured to be positioned such that the tapered pin of the first platform engages in the tapered hole of the second platform, and the tapered pin of the second platform engages in the tapered hole of the first platform.

According to another aspect of the invention, a method for storage and transfer of payloads in space includes supporting and holding a payload in position on a plate of a first platform, positioning the first platform adjacent to a second platform in space, in such a manner that the plate of the first platform is adjacent to a plate of the second platform, transferring the payload from the plate of the first platform to the plate of the second platform, and supporting and holding the payload in position on the plate of the second platform.

According to a further aspect of the invention, the method further includes positioning the first platform or the second platform in orbit around a celestial body. The method further includes transporting the first platform or the second platform from an Earth orbit to a lunar orbit. The method further includes propelling the first platform or the second platform through space using a motor. The first platform and the second platform are positioned adjacent to each other using thrusters.

According to a further aspect of the invention, supporting and holding the payload in position on the plate of the first platform includes receiving a rail provided on the payload in a groove provided in a surface of the plate of the first platform. Supporting and holding the payload in position on the plate of the first platform includes engaging a rail provided on the payload with a gear provided in the plate of the first platform.

According to a further aspect of the invention, supporting and holding the payload in position on the plate of the second platform includes receiving a rail provided on the payload in a groove provided in a surface of the plate of the second platform. Supporting and holding the payload in position on the plate of the second platform includes engaging a rail provided on the payload with a gear provided in the plate of the second platform.

According to a further aspect of the invention, positioning the first platform adjacent to the second platform includes engaging a docking mechanism provided on the first platform with a docking mechanism provided on the second platform. A tapered pin provided on the first platform engages in a tapered hole provided on the second platform. A tapered pin provided on the second platform engages in a tapered hole provided on the first platform.

According to a further aspect of the invention, positioning the first platform adjacent to the second platform includes aligning a groove provided in a surface of the plate of the first platform with a groove provided in a surface of the plate of the second platform in such a manner that a rail provided on the payload can pass from the groove of the first platform to the groove of the second platform. Aligning the groove of the first platform with the groove of the second platform includes engaging a docking mechanism provided on the first platform with a docking mechanism provided on the second platform. A tapered pin provided on the first platform engages in a tapered hole provided on the second platform, and a tapered pin provided on the second platform engages in a tapered hole provided on the first platform.

According to a further aspect of the invention, transferring the payload from the plate of the first platform to the plate of the second platform includes engaging a rail provided on the payload with a gear provided on the first platform. The gear is rotated to move the rail. The gear engages a plurality of teeth provided on the rail. The rail is received in a groove provided in a surface of the plate of the first platform.

According to a further aspect of the invention, transferring the payload from the plate of the first platform to the plate of the second platform includes engaging a rail provided on the payload with a gear provided on the second platform. The gear is rotated to move the rail. The gear engages a plurality of teeth provided on the rail. The rail is received in a groove provided in a surface of the plate of the second platform.

According to a further aspect of the invention, transferring the payload from the plate of the first platform to the plate of the second platform includes moving a rail provided on the payload from a groove provided in a surface of the plate of the first platform to a groove provided in a surface of the plate of the second platform.

BRIEF DESCRIPTION OF THE DRAWINGS

The above and other objects, features and advantages of the present invention will be made apparent from the following description of the preferred embodiments, given as non-limiting examples, with reference to the accompanying drawings in which:

FIG. 1A is a side view of two platforms according to the present invention in a docked condition, with a payload supported on one of the platforms;

FIG. 1B is a side view of the two platforms shown in FIG. 1A, depicting a payload being transferred between the two platforms;

FIG. 2A is a top view of two platforms having substantially circular top plates according to the present invention in a docked condition;

FIG. 2B is a top view of two platforms having substantially hexagonal top plates according to the present invention in a docked condition;

DETAILED DESCRIPTION OF THE PREFERRED EMBODIMENTS

Figure 3:
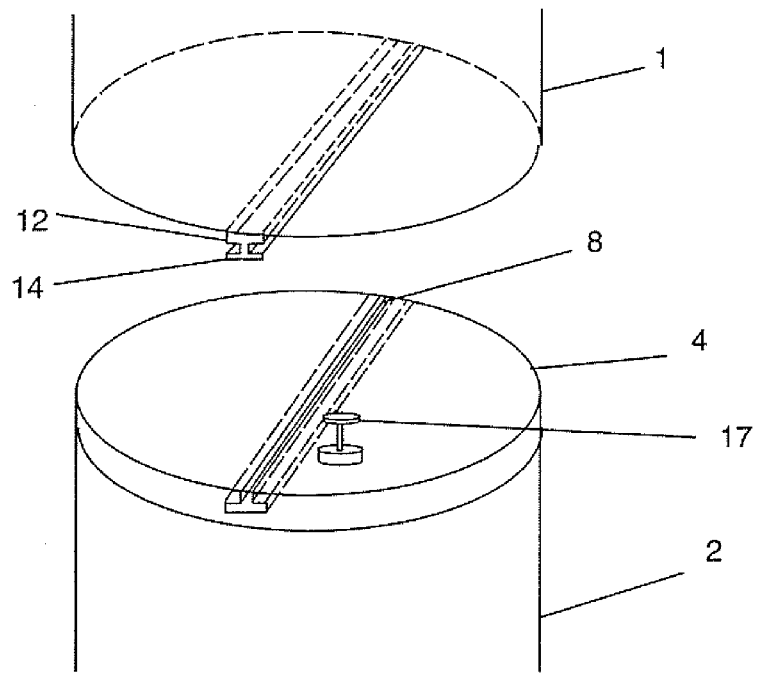
FIG. 3 is a perspective view of the top portion of a platform and the bottom portion of a payload according to the present invention.

A preferred embodiment of the present invention will be described below with reference to the drawings.

U.S. patent application Ser. No. 10/862,604, which was filed by the current inventors on Jun. 7, 2004, is incorporated by reference herein in its entirety. Such application discloses a space transportation system which may include small, unmanned vehicles, which transfer fuel tanks and payloads in earth orbit, to allow for further transport to a lunar orbit or to the surface of the Moon. Such application describes method for greatly increasing the range of relatively small unmanned space vehicles by providing mobile refueling platforms in space. These mobile platforms, also known as propellant transporters, can rendezvous and dock with space vehicles traveling to the Moon, for example, and replenish their depleted propellant reserves. This is conceptually similar to a car traveling over a long distance, which is able to refuel at gas stations along the way, instead of having to drag along a gasoline tanker. The present disclosure includes equipment to transfer payloads between two space platforms or vehicles, and describes a simple and reliable procedure to effect such transfers.

The term platform as used herein refers to both stationarily deployed platforms (without propulsion systems) as well as transport platforms (or vehicles) which have their own propulsion systems (such as thrusters, engines and motors). Further, such platforms may be manned or unmanned.

The term payload as used herein refers to any of a cargo by itself, a pallet or payload carrier having cargo secured thereto, or a cargo or payload container having cargo therein. In other words, a payload can include any item which need to be transported or stored in space, as well as any hardware such as supports or containers associated with such items.

FIGS. 1A and 1B show two adjacent platforms/vehicles 2 which are in a docked condition for transferring a payload 1. Each of the platforms may be of any suitable configuration, such as a substantially cylindrical shape. Each of the platforms 2 includes a lower plate 5 and an upper plate 4 which is configured to support a payload 1. As depicted in FIG. 1A, the payload 1 is located on the upper plate 4 of the left platform 2. As depicted in FIG. 1B, the payload 1 has been partially transferred from the upper plate 4 of the left platform to the upper plate 4 of the right platform (with the original position of the payload 1 indicated by dashed lines).

As shown in FIGS. 1A and 1B, the platforms 2 each include a rocket engine or motor 6 to propel the platform 2 through space as a transport vehicle. The platforms 2 also include suitable positioning mechanisms, such as thrusters 7, for positioning and aligning the platforms in space. Such motors 6 and thrusters 7, along with other operable mechanisms on the vehicle, may be controlled in any suitable manner, such as by remote control. Further, any suitable devices can be provided for detecting positions of the platform 2, such as optical rangers.

The upper plates of the platforms may be configured in any suitable manner, such as substantially circular shaped plates 4 of platforms 22 as shown in FIG. 2A, or as substantially hexagonal plates 9 of platforms 32 as shown in FIG. 2B. As shown in FIG. 2B, flat side edge portions of the plates 9 of two adjacent platforms 32 face each other in a docked condition. As shown in FIG. 2A, the flat side edge portions of the plates 4 of two adjacent platforms 22 face each other in a docked condition.

It is noted that the many of the structures of the platforms 2, 22, 32, 42 described herein are substantially the same, and will be indicated by the same numbers in the figures. Accordingly, the explanation of such similar elements is not repeated.

Figure 5:
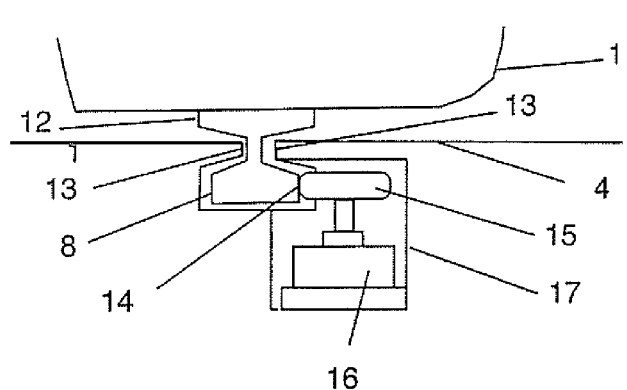
FIG. 5 is a top view of portions of two platforms according to the present invention approaching a docking position.

As shown in FIGS. 2A and 2B, a diametrically extending groove 8 is provided in each of the top plates 4 and 9. The grooves 8 of adjacent platforms are aligned with each other in a properly docked condition to allow for transfer of a payload 1. In order to achieve such alignment, each platform includes a docking mechanism of any suitable configuration. The docking mechanisms may, for example, be provided on the edge portions of the plates which face each other during docking. In the present embodiment, the docking mechanism of each platform includes a tapered pin 10 and a tapered hole 11. As shown in FIG. 5, the tapered pin 10 of the left platform approaches and engages in the tapered hole 11 of the right platform, and the tapered pin of the right platform approaches and engages in the tapered hole of the left platform, to ensure proper alignment of the platforms and the grooves 8. Although a single pin and a single hole are depicted on each platform in the figures, any suitable number of pins and holes may be provided. Further, any suitable structure for positively holding the platforms in a docked condition can be provided, such as electromagnets which can be selectively activated and deactivated.

Figure 4:
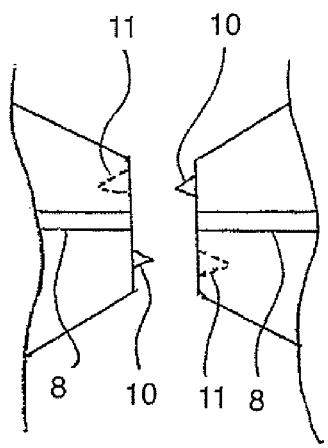
FIG. 4 is a cross-sectional view of the top portion of a platform and the bottom portion of a payload according to the present invention.

As shown in FIGS. 3 and 4, the groove 8 is configured to receive a rail 12 provided on the bottom surface of a payload 1. The rail 12 is received through an end portion the groove 8 provided on the side edge of the top plate 4. The groove 8 includes opposed lip portions 13 which are configured to maintain an enlarged portion 14 of the rail 12 within the groove. The enlarged portion 14 of the rail 12 is connected to the bottom of the payload 1 by a thin portion of the rail 12 which extends from the enlarged portion 14 and passes between the opposed lip portions 13 of the groove 8.

The enlarged portion 14 of the rail 12 includes a plurality of teeth extending along one side thereof. The platform includes a transfer mechanism configured to engage the rail 12 in order to move the rail 12 along the groove 8, and to hold the rail 12 in a stationary position. The transfer mechanism includes a gear 15 which engages the teeth of the rail 12. A motor 16 is provided for rotating the gear 15. In this manner, rotation of the gear 15 can be controlled in order to interact with the teeth of the rail 12 for transferring a payload 1 to and from the upper plate 4, 9 of a platform, and for holding a payload in position on the upper plate 4, 9 of a platform. A cavity or chamber 17 can be provided in an upper plate for containing the gear 15 and the motor 16. The chamber 17 is connected to the groove 8 in which a rail 12 is received.

As discussed above, and as shown in FIGS. 2A, 2B, 6A and 6B, two platforms are positioned adjacent each other for docking in such a manner that the grooves 8 of the platforms are aligned with each other. As noted above, the tapered pins 10 and tapered holes 11 facilitate this alignment during docking. In this manner, the rail 12 provided on the payload 1 can pass from the groove 8 of one of the platforms to the groove 8 of the other platform. Further, the gear 15 of a delivery platform (such as the left platform in FIGS. 1A, 1B and 7) engages and moves the rail 8 of the payload 1 toward a receiving platform. The gear 15 of the receiving platform (such as the right platform in FIGS. 1A, 1B and 7) engages and moves the rail 8 of the payload 1 until it is fully received in position on the receiving platform.

Although the embodiments depicted in the figures include only a single groove 8 provided in the surface of an upper plate, and a single rail 12 provided on the bottom of a payload, any suitable number of rails and grooves may be provided. For example, two parallel grooves can be provided in the surface of an upper plate, and two parallel rails, having the same spacing as the grooves, can be provided on the bottom of a payload. Providing a plurality of such grooves and rails will provide more support and connection between the payload and the platform.

Figure 6A:
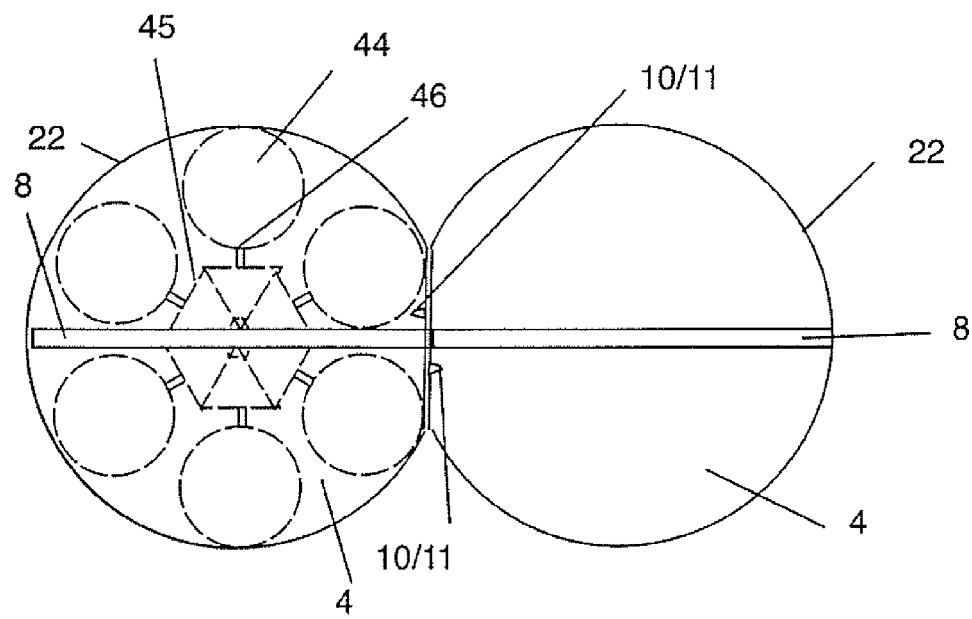
FIG. 6A is a top view similar to that of FIG. 2A, showing an embodiment in which the platforms are configured to support a plurality of propellant tanks.
Figure 6B:
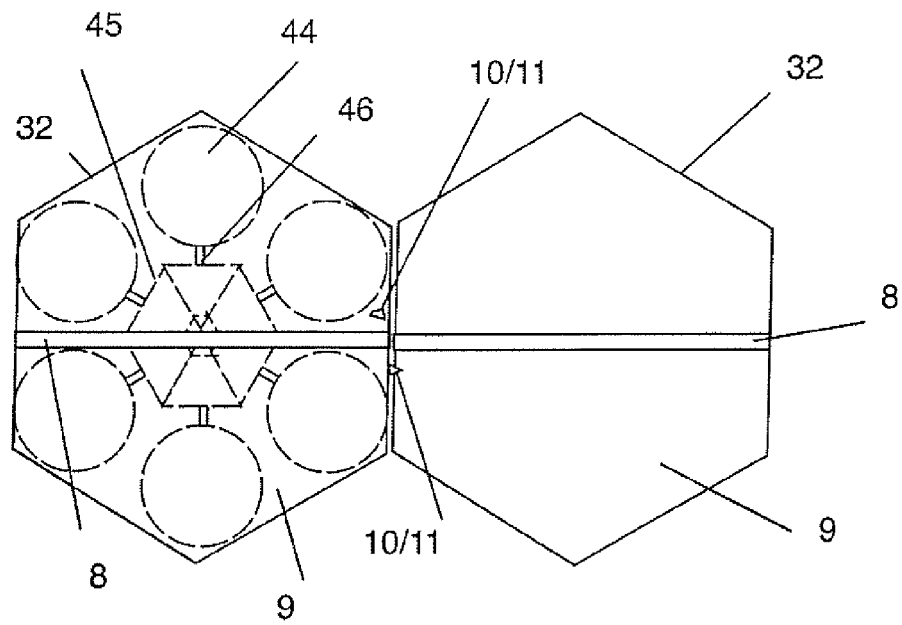
FIG. 6B is a top view similar to that of FIG. 2B, showing an embodiment in which the platforms are configured to support a plurality of propellant tanks.
Figure 7:
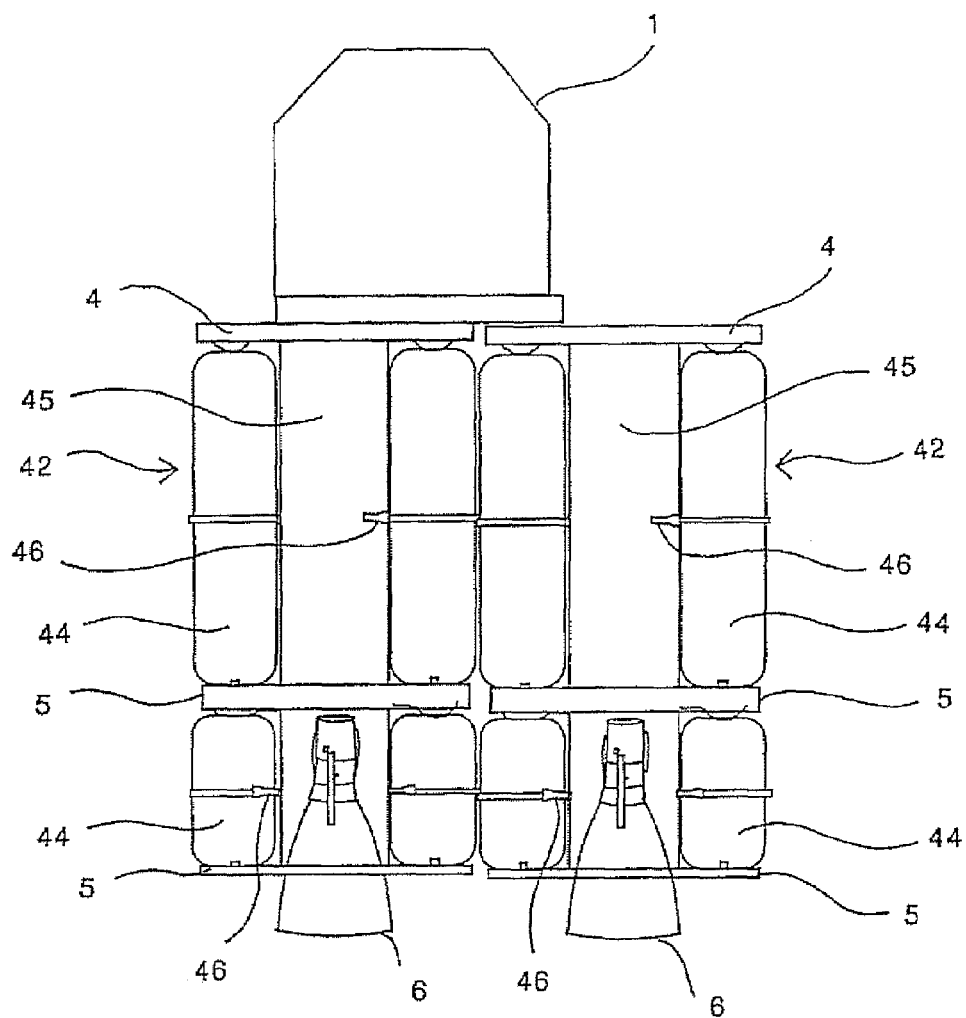
FIG. 7 is a side view similar to that of FIG. 1B, showing an embodiment in which the platforms are configured to support a plurality of propellant tanks.

FIGS. 6A, 6B and 7 show embodiments in which the platforms 42 are configured to support a plurality of propellant tanks 44 for storage and transfer. As shown in FIG. 7, plate 4 which supports the payload 1 is mounted on the top of a central inner structure 45 which may have any suitable configuration, such as a cylindrical or tubular shape. A number of additional plates or frames 5 are mounted to the central structure 45 for supporting propellant tanks 44. The plates or frames 5 may have any suitable configuration, such as a circular or hexagonal shape. The platforms 42 shown in FIG. 7 are configured to support an upper group of taller tanks and a lower group of shorter tanks.

Although the embodiment shown in FIG. 7 is configured to support two layers of tanks, any suitable number of plates or frames may be provided in order to support any suitable number of layers. Further, the plates or frames may be spaced at any suitable intervals in order to support tanks of various sizes. Although a layer includes six tanks as shown in FIGS. 6A and 6B, any suitable number of tanks may be included in a layer. Further, each layer may contain the same number of tanks, in corresponding vertically aligned positions, so that a pair of aligned tanks can be transferred to or from the platform.

Transfer mechanisms are provided on the platform 42 for transferring tanks to and from storage positions on the platform 42. An individual transfer mechanism may be provided for each of the separate storage positions. Each transfer mechanism includes an extendable arm 46 mounted to the central structure 45. The arms 46 are configured to extend radially from the central structure 45 at vertical mid-portions of the storage positions. The extendable arms 46 may be of any suitable configuration, such as in the form of telescoping arms. Further, each arm 46 includes a gripper at the free end thereof configured to positively grip bands provided on the tanks 44.

The platforms shown in FIG. 7 may have any suitable configuration. For example, FIG. 6A depicts adjacent platforms 22 having substantially circular upper plates 22, and FIG. 6B depicts adjacent platforms 32 having substantially hexagonal upper plates.

Figure 8A:
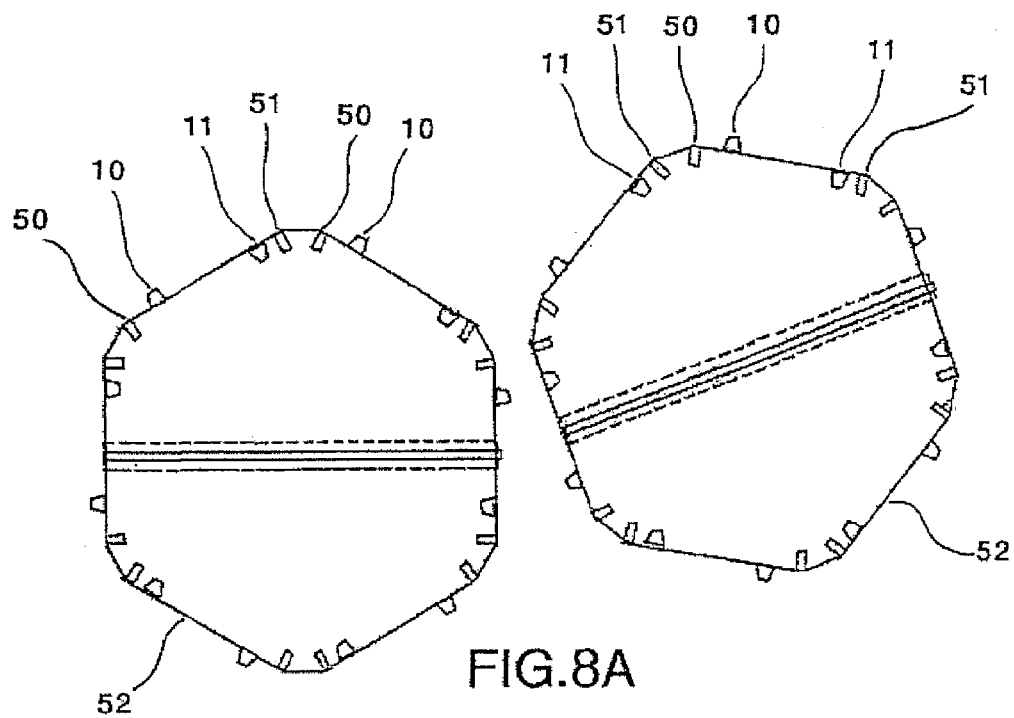
FIG. 8A is a top view of two platforms prior to docking.
Figure 8B:
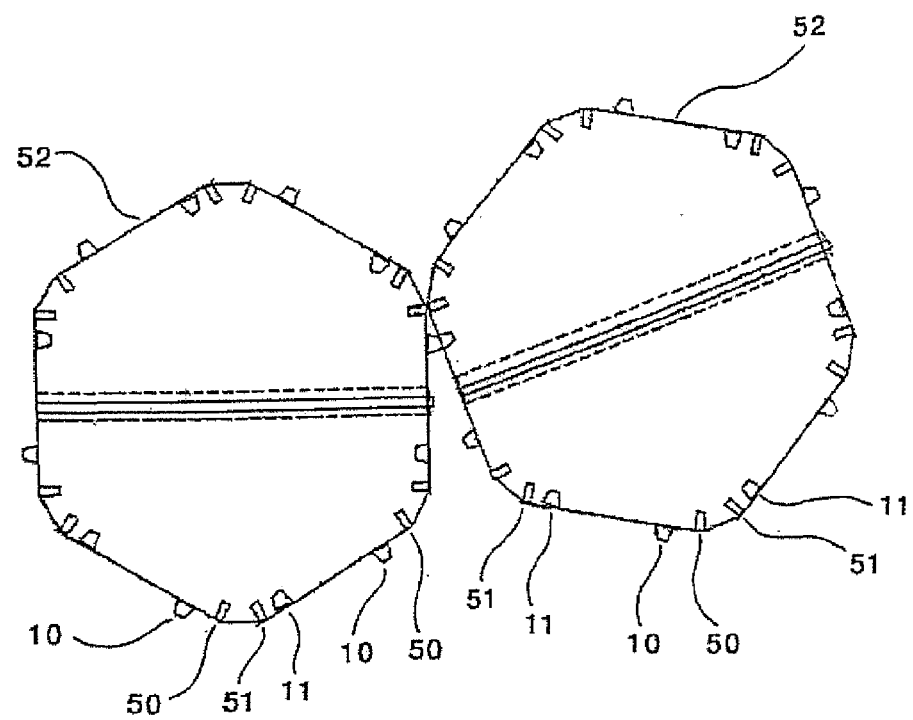
FIG. 8B is a top view of two platforms during rotational docking.
Figure 9:
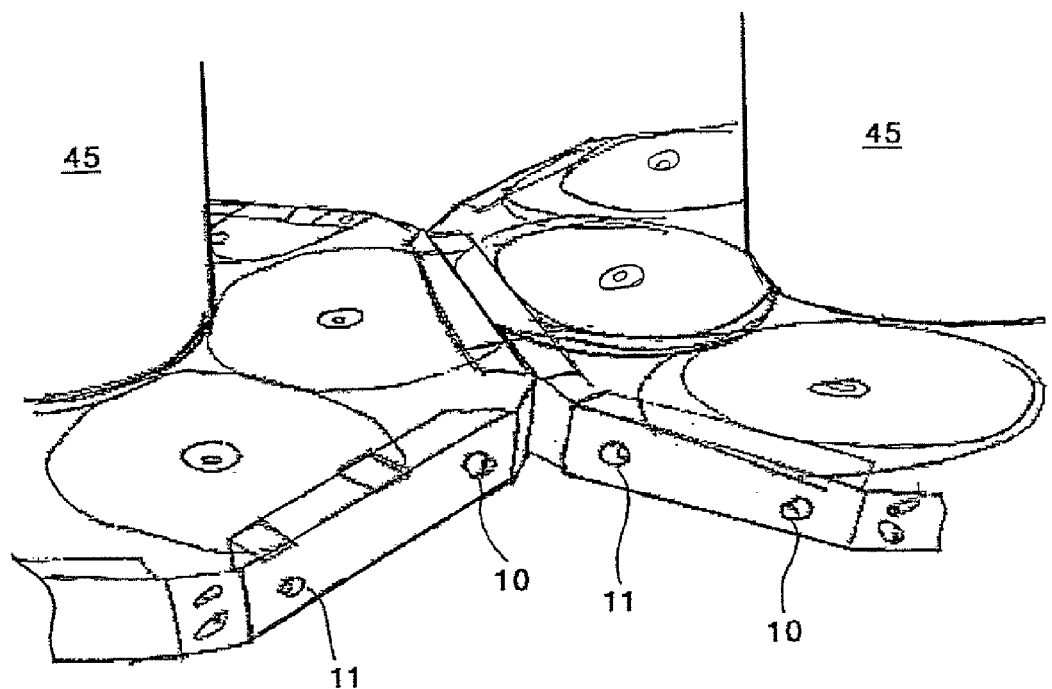
FIG. 9 is a perspective view of portions of two platforms in a docked condition.

As shown in FIGS. 8A and 8B, platforms 52 are provided with magnetic hinges to perform rotational docking. Each edge of the hexagonal plate includes an electromagnet 50 and tapered pin 10 on a first end portion, and an electromagnet 51 and tapered hole 11 on a second end portion. FIG. 8B shows a condition in which an electromagnet 50 of the left platform and an electromagnet 51 of the right platform are magnetically coupled, and a tapered pin 10 is partially inserted into a tapered hole 11. In this manner, the electromagnets 50, 51 which are magnetically engaged form a magnetic hinge about which the platforms can be rotated. Such rotation brings two respective edges of the plates into an adjacent docked condition. In such adjacent docked condition, the tapered pin 10 of each opposed edge is received in the tapered hole 11 of the opposite edge. Further, the opposed electromagnets 50, 51 at each end portion of the plate edge are magnetically coupled to maintain the platforms in the docked condition.

The platforms can be further rotated relative to each other in order to align other edges of their hexagonal plates by additional rotational docking. The polarity of the pair of opposed electromagnets 50, 51 at the first end portion of the plate edge can be changed so that they repel one another, while the magnetic coupling between the pair of opposed electromagnets 50, 51 at the second end portion of the plate edge is maintained. As a result, the coupled electromagnets 50, 51 at the second end portion of the plate edge serve as a magnetic hinge, and the repulsive force provided by the electromagnets 50, 51 at the first end portion of the plate edge causes the platforms to rotate about the magnetic hinge. In this manner, the platforms can be relatively rotated until the other edges of their hexagonal plates are in an adjacent aligned and docked condition, with their respective electromagnets 50, 51 magnetically coupled, and their respective tapered pins 10 received in their respective tapered holes 11. These steps can be repeated until all of the respective edges of the hexagonal plates have been rotationally docked in turn.

The present disclosure contemplates a system which includes a plurality of transportation platforms as discussed above, and a process for transferring payloads between such platforms.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A method for storage and transfer of payloads and propellant tanks in space, comprising
   supporting and holding a payload in position on a plate of a first platform;
   positioning the first platform adjacent to a second platform in space, in such a manner that the plate of the first platform is adjacent to a plate of the second platform;
   engaging a docking mechanism provided on the first platform with a docking mechanism provided on the second platform for precisely aligning the plates of the platforms, each docking mechanism comprising a plurality of tapered pins and tapered holes provided on an edge portion of the plate, the tapered pins and tapered holes being shaped to permit rotating engagement and disengagement;
   transferring the payload from the plate of the first platform to the plate of the second platform; and
   supporting and holding the payload in position on the plate of the second platform.

2. The method according to claim 1, further comprising positioning the first platform or the second platform in orbit around a celestial body.

3. The method according to claim 1, further comprising transporting the first platform or the second platform from an Earth orbit to a lunar orbit.

4. The method according to claim 1, further comprising propelling the first platform or the second platform through space using a motor.

5. The method according to claim 1, wherein the first platform and the second platform are positioned adjacent to each other using thrusters.

6. The method according to claim 1, wherein supporting and holding the payload in position on the plate of the first platform includes receiving a rail provided on the payload in a groove provided in a surface of the plate of the first platform.

7. The method according to claim 1, wherein supporting and holding the payload in position on the plate of the first platform includes engaging a rail provided on the payload with a gear provided in the plate of the first platform.

8. The method according to claim 1, wherein supporting and holding the payload in position on the plate of the second platform includes receiving a rail provided on the payload in a groove provided in a surface of the plate of the second platform.

9. The method according to claim 1, wherein supporting and holding the payload in position on the plate of the second platform includes engaging a rail provided on the payload with a gear provided in the plate of the second platform.

10. The method according to claim 1, wherein at least one tapered pin provided on the first platform engages in at least one tapered hole provided on the second platform, and at least one tapered pin provided on the second platform engages in at least one tapered hole provided on the first platform.

11. The method according to claim 1, wherein the docking mechanism of each platform includes magnets provided at both ends of flat edges of the plate, the magnets aligning one plate with respect to an adjacent plate, and rotating the one plate with respect to the adjacent plate, wherein the polarity of the magnets can be changed.

12. The method according to claim 1, wherein positioning the first platform adjacent to the second platform includes aligning a groove provided in a surface of the plate of the first platform with a groove provided in a surface of the plate of the second platform in such a manner that a rail provided on the payload can pass from the groove of the first platform to the groove of the second platform.

13. The method according to claim 12, wherein aligning the groove of the first platform with the groove of the second platform includes engaging the docking mechanism provided on the first platform with the docking mechanism provided on the second platform.

14. The method according to claim 13, wherein at least one tapered pin provided on the first platform engages in at least one tapered hole provided on the second platform, and at least one tapered pin provided on the second platform engages in at least one tapered hole provided on the first platform.

15. The method according to claim 1, wherein transferring the payload from the plate of the first platform to the plate of the second platform includes engaging a rail provided on the payload with a gear provided on the first platform and also engaging the rail with a gear provided on the second platform.

16. The method according to claim 15, wherein the gear is rotated to move the rail.

17. The method according to claim 15, wherein the gear engages a plurality of teeth provided on the rail.

18. The method according to claim 15, wherein the rail is received in a groove provided in a surface of the plate of the first platform.

19. The method according to claim 1, wherein transferring the payload from the plate of the first platform to the plate of the second platform includes moving a rail provided on the payload from a groove provided in a surface of the plate of the first platform to a groove provided in a surface of the plate of the second platform.

* * * * *